United States Patent [19]
Locke

[11] 3,824,368

[45] July 16, 1974

[54] LASER WELDING

[75] Inventor: Edward V. Locke, Rockport, Mass.

[73] Assignee: Avco Corporation, Cincinnati, Ohio

[22] Filed: Jan. 11, 1973

[21] Appl. No.: 322,737

Related U.S. Application Data

[63] Continuation-in-part of Ser. No. 213,941, Dec. 30, 1971, abandoned.

[52] U.S. Cl............... 219/121 LM, 219/121 EB, 331/94.5 A, 350/61
[51] Int. Cl............................................. B23k 9/00
[58] Field of Search........... 219/121 C, 121 EB, 85, 219/121 LM; 331/94.5 A; 350/61, 63

[56] References Cited

UNITED STATES PATENTS

| | | | |
|---|---|---|---|
| 3,242,314 | 3/1966 | Eckles | 219/343 |
| 3,601,576 | 8/1971 | Schiafli | 219/121 LM |
| 3,621,198 | 11/1971 | Herbrich | 219/121 L |
| 3,626,141 | 12/1971 | Daly | 219/121 L |

OTHER PUBLICATIONS

"Welding At High Speed With the $CO_2$ Laser" Metal Progress 11/70, pp. 59-61.
"$CO_2$ Laser Welding Joins the Parade" Welding Engineer, 8/70, pp. 42-44.
"Using Focussed Beams... For Welding and Brazing Metals" Svan Proiz, 1969, No. 9, pp. 1-5.
"Laser Welding of Aerospace Structural Alloys" Welding Research Supplement, 3/66, pp. 1,275-1,345.
"Evaluating Pulsed Laser Welding" Machine Design, 12/67, pp. 126, 128.

Primary Examiner—Bruce A. Reynolds
Attorney, Agent, or Firm—Charles M. Hogan; Melvin E. Frederick

[57] ABSTRACT

A method of laser welding is described wherein a concentrated high power laser beam is moved along a workpiece surface at an interaction point where a flow of gas is introduced. It has thus been found that ordinarily a standing absorption cloud of ionized material is formed by the interaction of the high power laser energy and workpiece which then dissipates a large portion of the laser beam; however, when a gas is flowed across the interaction point, ionization is prevented and consequently substantially all of the laser beam is able to reach the workpiece resulting in an improved weld. The gas flow, therefore, operates to improve the metal working process by allowing the laser energy to pass uninhibited to the workpiece.

5 Claims, 8 Drawing Figures

- θ: MELTING TEMPERATURE
- k: THERMAL CONDUCTIVITY
- P: LASER POWER
- V: WELDING SPEED
- K: THERMAL DIFFUSIVITY
- d: WELD WIDTH (SEE FIG.4b 4b)
- t: PLATE THICKNESS (SEE FIG. 4b)

LASER WELDING

This application is a continuation-in-part of application Ser. No. 213,941, filed Dec. 30, 1971, now abandoned.

This invention relates to a method of welding various materials, and more particularly to laser welding devices in which the thermal energy for the process is derived from a source of high intensity of radiation in the wavelength range of 3,000 to 27,000A, commonly known as a laser, an acronym for "light amplification by stimulated emission of radiation".

Conventional welding techniques comprise: resistance welding by passing current through the workpiece placed between the ends of two electrodes; ultrasonic welding in which a beam of high-frequency sound waves above the audible range is passed through the workpiece placed between two vibrating electrodes; friction welding in which the two pieces are made to rotate with respect to each other, generating sufficient frictional heating to generate the weld; electron beam welding in which an intense focused beam of electrons impinges on the joint to be welded; or utilize a flame from a burning gas, such as acetylene or hydrogen, or an electric arc. Except for electron beam welding and friction welding, these methods use electrodes in physical contact with the workpiece and thus may heat a surrounding area several times larger than the weld area, causing grain growth in the material, stress concentration at times and weakening of the parent material at the heat-affected areas. This condition necessitates additional heat treatment of the workpiece (if heat treatable) to recrystallize and reduce the grain size to normal dimension and to relieve stress in the material which may result in cracking and degradation at regions contiguous to welded area. Obviously, this additional processing subsequent to welding is costly and time-consuming, and for some materials, such as for etched electronic circuit boards of epoxy-glass substrate, the heat treatment will destroy the circuit board. Friction welding is generally limited to the joining of axisymmetric pieces. Because of scattering of electrons by air, electron beam welding requires that the workpiece be located in a vacuum chamber or in out-of-vacuum systems, that the exit aperture of the electron gun be very accurately located just above the workpiece. In either case, the flexibility and adaptability of the system is limited.

In contrast with these conventional welding methods, high power laser welding has the following unique advantages: (1) The laser beam can be focused by means of an optical system to an area as small as 1 mil in diameter, so that the deep penetration mode of welding, similar to vacuum electron beam welds, can be achieved. (2) The optical system and workpiece can be located in atmospheric pressure air since this does not attenuate or scatter the laser beam. (3) The diameter of the beam focus may be increased to any desired size above 1 mil by appropriate adjustment of the optical system. (4) Because of the high radiant intensity of the laser beam, it is possible to drill small holes as small as 1 mil in diameter in sheets of metals, glass, and in ceramics. (5) Micromachining of thin films and microminiature electronic or mechanical components is possible by vaporizing the material in accordance with a desired pattern. (6) The welded joint by a laser is strong and there is less grain growth in the metal surrounding the weld area, and, therefore, in many cases, no heat treatment of the workpiece is necessary. (7) The welding energy of a laser can be varied by control settings of the machine. (8) In the case of aircraft, rocket, or any other bulk structure, the welding can be accomplished from the outside of the structure by focusing the laser beam on the structure. (9) Because the laser beam can be "piped" through periscope optical systems without substantial attenuation of its intensity, the welding energy can be carried to parts and areas inaccessible by means of conventional welding equipment.

Unfortunately, difficulties have arisen due to using a high power laser beam in that material as it is being welded creates an absorption cloud immediately above the interaction zone. This cloud absorbs and scatters the beam and thereby reduces the efficiency of the laser welding system. This difficulty may be avoided by flowing an inert gas across the interaction area. It is, therefore, an object of the present invention to provide improved method and apparatus for laser welding in which gas is introduced during operation to improve the efficiency and versatility.

It is another object of the present invention to provide an improved method and apparatus for laser welding using gas to avoid the absorption of the laser energy prior to reaching the material to be welded.

Other objects and advantages of the invention will become apparent from the following specification taken in conjunction with the accompanying drawings wherein like characters of reference designate corresponding parts throughout the several views of the invention, and wherein.

Figure 1:
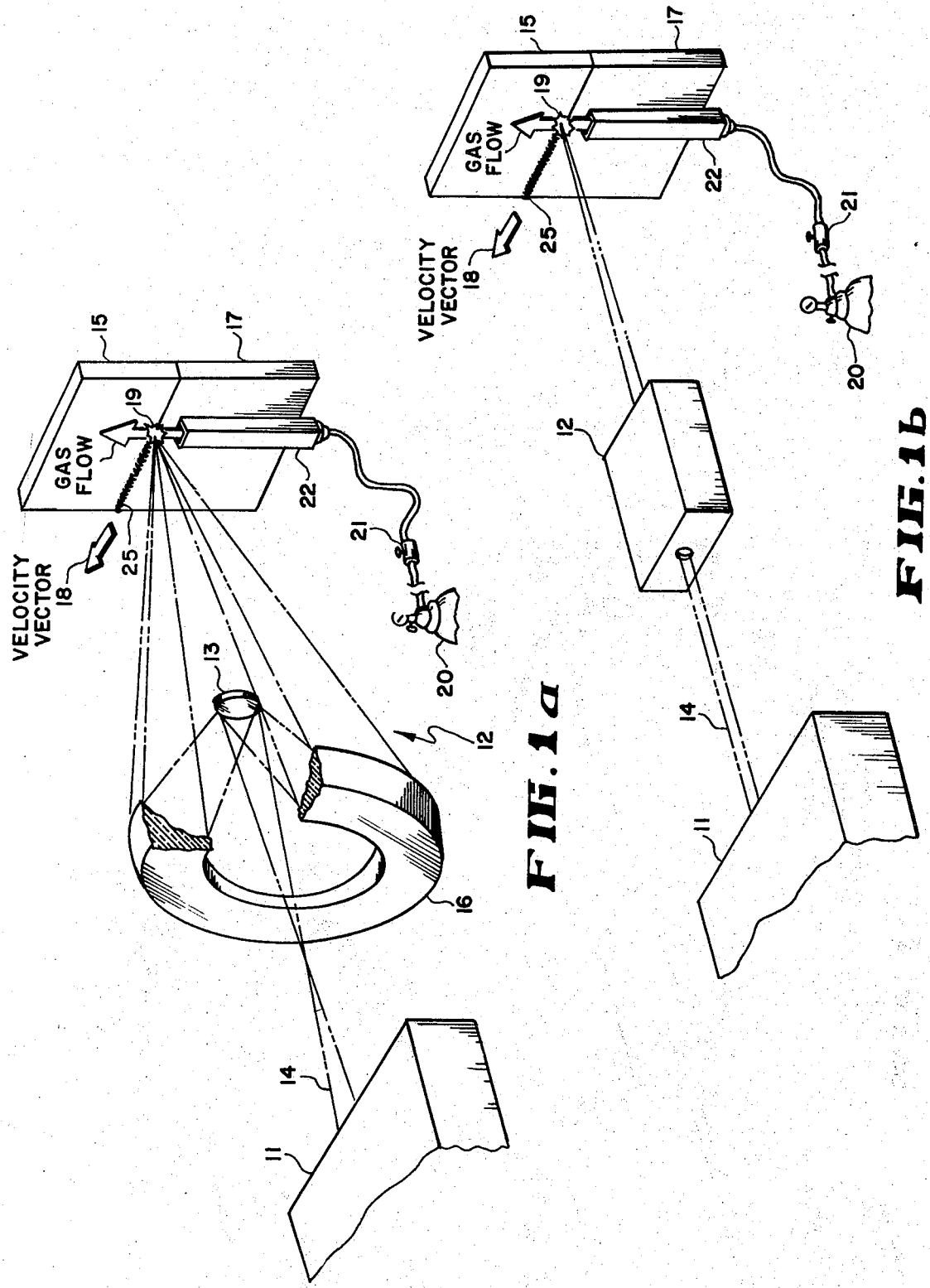
FIGS. 1a and 1b are perspective views of laser welding apparatus according to the invention.

With reference now to the drawings and more particularly to FIGS. 1a and 1b, there is shown a preferred embodiment of the invention. A source of high laser energy capable of generating powers in excess of 8 kilowatts is positioned so that the beam of energy 14 enters an optical system generally designated as 12. Characteristics of two typical lasers which may comprise the source 11 are listed in Table 1 below. One such laser is of the gas dynamic type described in patent application, Ser. No. 80,152 filed Oct. 12, 1970, now U.S. Pat. No. 3,713,030, assigned to the same assignee as this application. This laser which delivered 20 kilowatts of continuous (cw) power, had an optical cavity which was an unstable oscillator and operated with an output coupling of 60 percent. The resulting beam was an annular beam with the missing area in the center representing 40 percent of the total area of the beam. Independent measurements of the beam quality of this device obtained by focal point scans indicated beam divergence which was close to the defraction limit. Another laser which may be used in carrying out this invention is an electric discharge laser type described in patent application, Ser. No. 72,982 filed Sept. 17, 1970, now U.S. Pat. No. 3,702,973 and assigned to the same assignee as this application. This laser has been operated at a continuous power of 16 kilowatts. The electric laser is a closed cycle, continuous wave device with a total electric efficiency of approximately 10 percent. The optical cavity was also an unstable oscillator. The output coupling was only 40 percent, since the annular output beam had an obstruction of 60 percent.

TABLE 1: LASER CHARACTERISTICS

Gas Dynamic Laser (GDL)
  Power: 15–20 kW
  Optical Cavity: unstable oscillator, 60 percent coupling
  Beam quality: near diffraction limited Electric Discharge Laser (EDL)
  Power: 1–16 kW
  Optical Cavity: unstable oscillator, 40 percent coupling
  Beam quality: near diffraction limited The optical system 12 illustrated in FIG. 1b may comprise optics to provide control, focus, and/or direction control. In the preferred embodiment as illustrated in FIG. 1a, the beam 14 emerging from the laser source 11 reaches a primary focal point just outside the laser device itself. The optical system 12 comprises a Cassegrain optical system which receives the beam 14 on the receiver reflective elements 13. The beam 14 is then reflected from elements 13 to transmitter elements 16 so that the focal point is reimaged on to the two parts 15 and 17 which comprise the workpiece to be welded. The parts 15 and 17 are butted together and transported in a direction indicated by the velocity vector 18 through the secondary focal point at weld site 19 by a conventional translational table (not shown). Rather than moving the workpiece as previously described, the beam 14 may alternatively be optically moved by a conventional mirror system contained within the optical system 12.

The secondary focal point is disposed a substantial distance from the optical system that sputtering, vaporization and the like from the workpiece can not adversely affect the optical system.

In order to prevent absorption or dissipation of the impinging reimaged beam 14 by the absorption cloud created by the interaction of laser energy and material in weld site 19, a flow of gas above the weld is provided. This flow may be created by a suction pump drawing a gas across the weld site 19 and into the pump. Preferably, the flow of gas is provided from a source of inert gas 20, such as helium or a mixture of inert gases such as helium and nitrogen, carbon dioxide, oxygen or the like. The amount of gas flow at the weld site 19 may be controlled by a standard metering system 21 placed in the gas line. A gas nozzle 22 is positioned near weld site 19 to control the direction and quantity of gas flow across the weld site 19.

Figure 2:
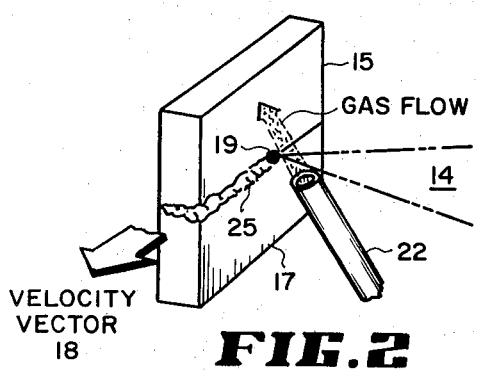
FIG. 2 is an expanded perspective view of the interaction zone.
Figure 3:
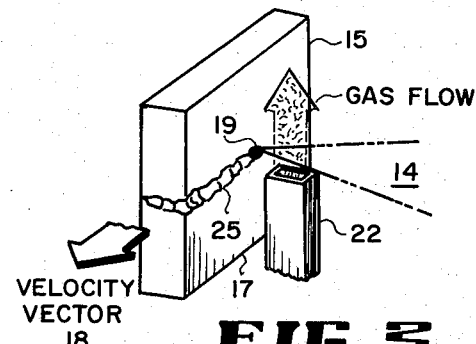
FIG. 3 is another expanded perspective view of the welding interaction zone in another embodiment of the invention.
Figure 4A:
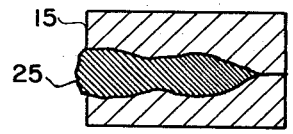
FIGS. 4a, 4b and 4c illustrate three plane cross sectional views of materials welded according to the invention.
Figure 4B:
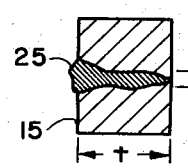
Figure 4C:
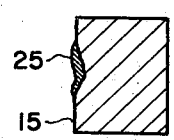

Attention is now directed to FIGS. 2 and 3 which illustrate two possible arrangements of apparatus in accordance with the invention. In FIG. 2, one arrangement of apparatus is shown using cylindrical copper tubing as a gas nozzle 22 emitting less than two hundred cubic feet per hour of helium close to the workpiece. As shown in FIG. 2, nozzle 22 is directed at the point of impingement of the laser beam 14 at the weld site 19. The interaction of the laser beam on the workpiece generates a weld 25 as the workpiece moves in the direction of the velocity vector 18. A resulting weld made at a power of 16 kW with the EDL laser in 304 stainless steel was made at 25 inches per minute, approximately ¾ inches deep and 3/16 inches wide as illustrated in FIG. 4a. Another arrangement of apparatus in accordance with the invention is illustrated in FIG. 3. In this configuration, nozzle 22 is positioned parallel to the workpiece, but orthogonal to both the laser beam direction and velocity vector direction. A resulting weld made by the GDL laser at 20 kW in 304 stainless steel was 100 inches per minute and approximately ½ inch deep with an average width of 3/32 inches as shown in FIG. 4b. The results of the welding operation in 304 stainless steel with the 20 kW GDL laser without a gas jet is illustrated in FIG. 4c which shows a shallow and wide weld which was ¼ inch in width and only ⅛ inch in depth. This clearly illustrates that a weld created by very intense radiation without the use of inert gas will create unsatisfactory welds. Similar effects were observed when welding 1020 partially killed carbon steel. In this case, the difference between using a gas assist and not using a gas assist were significant.

Theoretical calculations of the penetration to be expected in laser welding are in reasonably good agreement with the experimental data. Penetration up to ¾ inch has been achieved as illustrated in FIG. 4a at a rate of 25 inches per minute in a 4 to 1 depth to average width fusion zone in 304 stainless steel at a 16 kW power level. Penetration of nearly ⅜ inch in a 4 to 1 aspect ratio fusion zone was achieved at 8 kW.

Figure 5:
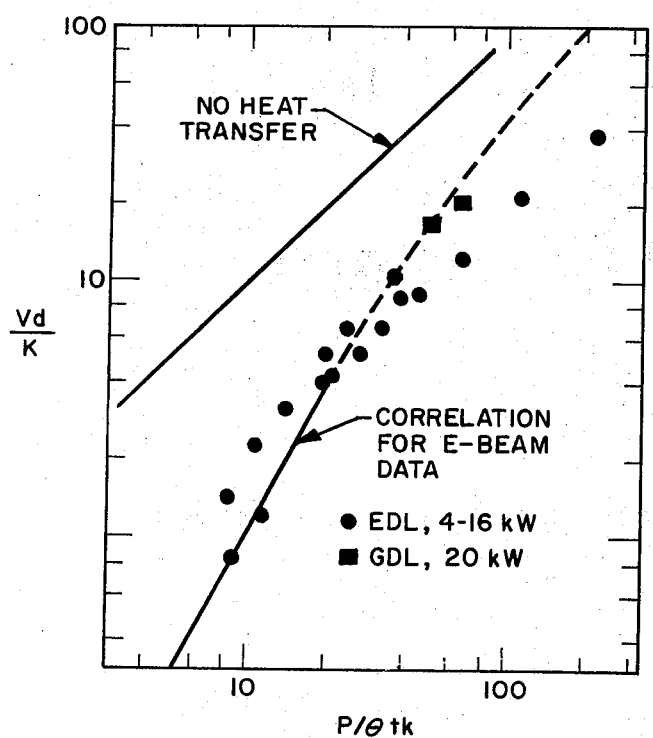
FIG. 5 is a graphic representation of the effect of laser power on welding speed.

The results of various laser welding tests performed by using the present invention are correlated in FIG. 5. In this figure, the nondimensionalized welding speed is plotted as a function of the nondimensionalized laser power. The power is normalized with respect to the power conducted into the parent material, and the welding speed is normalized with respect to the speed of the characteristic isotherm as heat is conducted into the adjacent material. The solid line shown in this figure is a correlation obtained for E-beam welding data. This correlation has been shown to be accurate over many orders of magnitude in these two nondimensional parameters.

At values of $P/\theta tk$ (where P is laser power, $\theta$ is melting temperature, $t$ is plate thickness illustrated in FIG. 4b, and $k$ is the thermal conductivity) greater than 100, heat conduction ($k$) is unimportant and the welding speed is a linear function of the power (P). However, at values of $P/\theta tk$ less than 100, heat conduction becomes important and the welding speed drops with the square of the power. Hence, for any particular weld, the ratio of the actual power needed to the power needed without any heat conduction is a measure of the efficiency. It is seen that for the fastest welds obtained in the test at 20 kW an efficiency of approximately 45 percent was obtained. At the lower power levels of 8kW, the experimentally obtained efficiency was about 28 percent.

As previously mentioned, during the testing of laser welding apparatus at power levels greater than 8 kW, an interesting phenomenon occurred when no gas was used. The interaction zone of the laser beam with the workpiece was observed to be only slightly incandescent. However, a region of very high luminosity was seen to be located in the laser beam but displaced well away from the workpiece. Apparently, a significant amount of the materials to be welded was vaporized at the interaction zone, ejected backward into the incoming laser beam, and ionized by the laser beam. This standing absorption cloud of ionized material dissipated the incident laser energy and only allowed enough of the laser beam to penetrate to the workpiece to maintain the vaporization and ionization of the vaporized material.

These phenomena of a standing absorption cloud with no gas assist and the difference in types of welds clearly demonstrate the significance of a proper gas assist for laser welding. Below certain powers, no ionization is observed. However, at higher powers, precautions must be taken such as that taught herein to prevent the formation of this absorption cloud of ionized material for laser welding. The direction of the gas flow may be applied to almost any angle radial from the interaction point.

The prior art welding devices have introduced gas flow into the interaction zone primarily to shield the material being welded. This shielding gas prevented impurities such as oxides from forming within the welded material whereas the present invention utilizes gas flow to permit high power laser welding to be accomplished. As previously pointed out, without a gas assist, high power laser welding is not feasible.

It should be further noted that all power levels previously noted have been for a continuously operating laser. However, gas assist is also required if the laser is operated in the pulsed mode with a sufficiently high average power or with a sufficiently high peak power in combination with a sufficiently long pulse length.

While there has been shown what is at present considered to be the preferred embodiment of the invention, it will be understood by those skilled in the art that various changes and modifications may be made in the preferred apparatus and method without departing from the proper scope of the invention as claimed in the appended claims.

I claim:

1. The method of forming by laser energy a weld along a line of contact between two pieces of material comprising the steps of:
   a. providing a laser source having an output laser beam with a power in excess of 8 KW;
   b. disposing reflecting means to receive and reflect said laser beam to a focal point disposed at said line of contact to form a weld there along and spaced a distance from said reflecting means that any vapor produced from the metal being welded cannot contact said reflecting means;
   c. controlling the power of said laser beam to provide an output power in excess of about 8 KW and energy at said focal point sufficient to form from said metal a cloud of vapor and then ionize said vapor over said focal point;
   d. causing said focal point and line of contact to move relative to one another;
   e. directing a flow of inert gas substantially normal to and through the axis of said beam and above and spaced from said focal point; and
   f. controlling said flow of gas to substantially prevent ionization of said vapor by providing a flow above said focal point whereby said gas and vapor does not remain in said laser beam for a time sufficient for ionization thereof to occur, thereby substantially preventing radiation of said beam away from said focal point.

2. A method in accordance with claim 1 wherein the direction of flow of said gas is at least substantially normal to said direction of movement.

3. A method in accordance with claim 2 wherein said laser source is operated in the cw mode.

4. A method in accordance with claim 2 wherein said laser source is operated in the pulsed mode with a peak pulse power and pulse width sufficient to produce a cloud of vapor and then ionize said vapor in the absence of said gas flow.

5. A method in accordance with claim 1 wherein said gas comprises helium and the rate of gas flow is about two hundred cubic feet per hour.

* * * * *

PO-1050
(5/69)

UNITED STATES PATENT OFFICE
CERTIFICATE OF CORRECTION

Patent No. 3,824,368            Dated July 16, 1974

Inventor(s) Edward V. Locke

It is certified that error appears in the above-identified patent and that said Letters Patent are hereby corrected as shown below:

Column 5, line 41 (Claim 1, line 2), for "material"

read --metal--.

Signed and sealed this 8th day of October 1974.

(SEAL)
Attest:

McCOY M. GIBSON JR.            C. MARSHALL DANN
Attesting Officer                  Commissioner of Patents